US006959989B2

(12) United States Patent
Holm

(10) Patent No.: US 6,959,989 B2
(45) Date of Patent: Nov. 1, 2005

(54) HARD-HAT FLIP-UP SAFETY GLASSES

(76) Inventor: Barent Holm, 23515 Lyons Ave., Unit S6, Valencia, CA (US) 91355

(*) Notice: Subject to any disclaimer, the term of this patent is extended or adjusted under 35 U.S.C. 154(b) by 0 days.

(21) Appl. No.: 10/921,779

(22) Filed: Aug. 18, 2004

(65) Prior Publication Data

US 2005/0078273 A1 Apr. 14, 2005

Related U.S. Application Data

(60) Provisional application No. 60/496,315, filed on Aug. 18, 2003.

(51) Int. Cl.[7] .......... G02C 3/00

(52) U.S. Cl. .......... 351/155; 351/158; 24/3.3; 2/10

(58) Field of Search .......... 351/155, 41, 158; 2/10; 24/3.3

(56) References Cited

U.S. PATENT DOCUMENTS 1,709,765 A 4/1929 Auel
1,955,232 A 4/1934 Gallaway .......... 2/10
2,026,741 A 1/1936 Kintz .......... 2/10
2,204,688 A 6/1940 McClung et al. .......... 2/10
2,467,448 A 4/1949 Vaca .......... 2/10
2,475,471 A 7/1949 Brown et al. .......... 2/10
2,481,960 A 9/1949 Wall et al. .......... 2/10
2,538,608 A 1/1951 Vaca .......... 2/10
2,560,669 A 7/1951 Vaca .......... 2/10
2,648,091 A 8/1953 Jones .......... 16/140
3,336,598 A 8/1967 Aebersold et al. .......... 2/10
4,432,100 A 2/1984 Bates .......... 2/424
4,819,274 A 4/1989 Day .......... 2/10
4,951,316 A 8/1990 Moody .......... 2/10
5,056,164 A 10/1991 Lisle et al. .......... 2/453

(Continued)

*Primary Examiner*—Hung Xuan Dang
(74) *Attorney, Agent, or Firm*—Pedersen & Co., PLLC; Ken J. Pedersen; Barbara S. Pedersen

(57) ABSTRACT

A system for attaching safety glasses to headwear often called a "helmet" or a "hard-hat" has multiple adjustments that fit the glasses to the individual user and that allow the user to flip the glasses back and forth between in-use and removed positions. The preferred system includes a base piece that attaches to the interior or underside of the helmet, near the wearer's face at or near the junction of the helmet's bill/brim and dome. A preferred second piece receives a portion of the glasses at its distal end, and, at its proximal end, slideably connects to the base piece. The second piece may be locked at various positions relative to the base piece, to adjust, either incrementally or continuously, the distance of the glasses from the helmet. This slidable adjustment between the base piece and second piece makes it possible to adjust the glasses in a generally vertical direction, that is, generally parallel to the plane of the lenses of the glasses when being used, as best suits the particular user. The clamping or gripping mechanism on the second piece distal end allows the glasses to pivot relative to the second piece and, hence, to the helmet. Thus, the user may pivot the glasses up from the eyes, out of his line of sight, or down in front of the eyes as close to the user's face as desired. This pivoting, then, provides some horizontal adjustment in the position of the glasses relative to the eyes and nose. Further, at least some portions of the preferred system are flexible or are flexibly connected to the helmet to absorb shock created when the helmet or safety glasses are struck.

20 Claims, 4 Drawing Sheets

U.S. PATENT DOCUMENTS

| | | | | |
|---|---|---|---|---|
| 5,129,102 | A | 7/1992 | Solo | 2/10 |
| 5,347,655 | A | 9/1994 | Garrett | 2/10 |
| 5,412,812 | A | 5/1995 | Gatchalian | 2/10 |
| 5,533,207 | A | 7/1996 | Diaz | 2/10 |
| 5,615,413 | A | 4/1997 | Bower | 2/10 |
| 5,687,420 | A | 11/1997 | Chong | 2/10 |
| 5,689,827 | A | 11/1997 | Ryder | 2/10 |
| D387,191 | S | 12/1997 | Berke | D2/891 |
| 5,692,234 | A | 12/1997 | Yuen | 2/10 |
| 5,819,311 | A | 10/1998 | Lo | 2/12 |
| D403,490 | S | 1/1999 | Posner | D2/866 |
| 5,987,640 | A | 11/1999 | Ryder | 2/10 |
| 6,174,058 | B1 | 1/2001 | Hsiao | 351/155 |
| 6,595,635 | B2 * | 7/2003 | Schubert | 351/155 |
| 2002/0023287 | A1 | 2/2002 | Badillo et al. | 2/209.13 |
| 2002/0035745 | A1 | 3/2002 | Spell | 2/209.13 |
| 2002/0069489 | A1 | 6/2002 | Morris | 24/3.12 |
| 2002/0073994 | A1 | 6/2002 | Patel | 128/201.17 |
| 2002/0163486 | A1 | 11/2002 | Ronzani et al. | 345/87 |

* cited by examiner

HARD-HAT FLIP-UP SAFETY GLASSES

This application claims priority of Provisional Application Ser. No. 60/496,315, filed Aug. 18, 2003, and incorporated herein by this reference.

BACKGROUND OF THE INVENTION

1. Field of the Invention

This invention relates generally to the field of safety glasses, and more particularly, to safety glasses attached to headwear.

2. Related Art

The present invention relates to safety helmets or "hard-hats" with attached safety glasses. On construction sites, workers must wear protective gear for their heads and eyes. Safety goggles are typically uncomfortable to wear, especially during hot weather when the air inside goggles can become very hot. Also, wearer's frequently remove their goggles for various reasons such as to wipe sweat out of their eyes or to improve the acuity of their vision. Thus, it is common for safety goggles to be damaged or lost. One solution to this problem is to attach a pair of protective glasses to the bill of the worker's safety helmet. Means for flipping the safety glasses up toward the helmet bill away from the wearer's face allows the wearer to "remove" the glasses without the danger that they will be lost or damaged while not in use.

Existing means for attaching safety glasses to a helmet do not allow for the position of the glasses to be adjusted relative to the user's face. Because every person's face is unique, safety glasses attached at a given point may be too close to one wearer's face and too far away from another. Unfortunately, safety helmets are from time to time struck by other objects. Because existing means for attaching safety glasses are rigid, the shock from such a blow can be transferred from the glasses to the user's face. This is especially problematic when the glasses are too close to the user's face. Similarly, the safety glasses may be struck directly, which can break them or result in the helmet being knocked off.

Issued patents relating to safety glasses attached to headwear are reviewed hereinafter.

Jones (U.S. Pat. No. 2,648,091) discloses a stud and socket snap fastener assembly, which is adapted for use in attaching an eyeshield to the visor of a cap.

Day (U.S. Pat. No. 4,819,274) discloses a detachable eye shield adjustably mounted on a mounting block which is removably engaged in a dovetail groove formed on the central portion of the under side of the visor member of the cap. A shaft member disposed on the upper frame of the eye shield is pivotally snap-engaged in the holder portion of the mounting block whereby the eye shield can be raised up and down relative to the visor member.

Moody (U.S. Pat. No. 4,951,316) discloses a sun visor with eyeshield in which the eyeshield can be positioned, in a positive and secure manner, both up and down and at incremental distances from the wearer's eyes.

Solo (U.S. Pat. No. 5,129,102) discloses a cap with removable flip up and down glasses. The lenses snap into the receiving member and pivot at its two attachment points.

Diaz (U.S. Pat. No. 5,533,207) discloses an eyeglass and cap combination in which eyeglasses downwardly depend from a projecting bill. A pivot device connects the eyeglass frame with the bill whereby the eyeglasses may be positioned between an operative position in front of the eyes or a storage position adjacent to the bill or visor underside. The pivot device includes a frictional detent to maintain the eyeglasses in either one or the two positions.

Ryder (U.S. Pat. No. 5,987,640) discloses a visor and eyeshield combination that allows the wearer to adjust the eyeshield by flipping the eyeshield to a rest position or down to an in-use position. The wearer may also adjust the distance of the eyeshield from the wearer's face.

Thus, there is still a need for an improved safety glasses and safety helmet combination. The present invention addresses these problems with a flexible, shock-absorbing attachment system that can be adjusted vertically and horizontally to better fit individual users. The combination of these features will absorb the shock from a blow to the helmet rather than transmitting it to the safety glasses and wearer's face.

SUMMARY OF THE INVENTION

The present invention is a system for mounting safety glasses on headgear. The preferred embodiment comprises a two-piece mechanism; one piece attaches to the "helmet" or "hard-hat," one piece receives the safety glasses, and preferably the two pieces are adjustably attachable relative to each other. The adjustable attachment also allows the position of the glasses to be adjusted after attachment to accommodate different users. Further, the system preferably is flexible or has flexible zones that absorb shock created when the helmet or safety glasses are struck.

In a preferred embodiment for attaching safety glasses to a safety helmet or other headwear, a base piece preferably attaches to the interior of the helmet in front of the wearer's face at or near the junction of the helmet's bill and dome. A preferred second piece includes a clamping mechanism that securely holds a pair of safety glasses, which slide into a channel on the base piece and can be held in place at multiple points. This makes it possible to adjust the glasses in a generally vertical direction as best suits the particular user. The clamping mechanism allows the glasses to pivot at the point of attachment. Thus, the user may pivot the glasses up to the bill, out of his line of sight, or down in front of the eyes as close to the user's face as desired. This allows the position of the glasses to be adjusted horizontally.

BRIEF DESCRIPTION OF THE DRAWINGS

The accompanying drawings illustrate several aspects of embodiments of the present invention. The drawings are for the purpose only of illustrating preferred modes of the invention, and are not to be construed as limiting the invention.

DETAILED DESCRIPTION OF THE INVENTION

Referring to the Figures, there are shown some, but not the only, embodiments of the invented mounting system for safety eyewear. The present invention is a system for mounting safety glasses on headgear. The preferred embodiment comprises two pieces that are adjustably attachable relative to each other. The adjustable attachment also allows the position of the glasses to be adjusted in a generally vertical plane roughly parallel to the plane of the glasses, in order to accommodate the particular user. The preferred embodiment also preferably is flexible or includes one or more flexible portions so that the attachment system will absorb shock from blows to the helmet rather than transferring the shock to the user's face via the glasses. The preferred embodiment of the invention contemplates attaching safety glasses to safety helmets such as worn on construction sites, but may be easily adapted and configured for other types of helmets. The preferred safety glass holder allows the safety glasses to pivot around the attachment point so that they may be moved down in front of the user's eyes or up away from the user's eyes and toward the helmet's bill, eliminating the incentive to remove the glasses completely.

Figure 3:
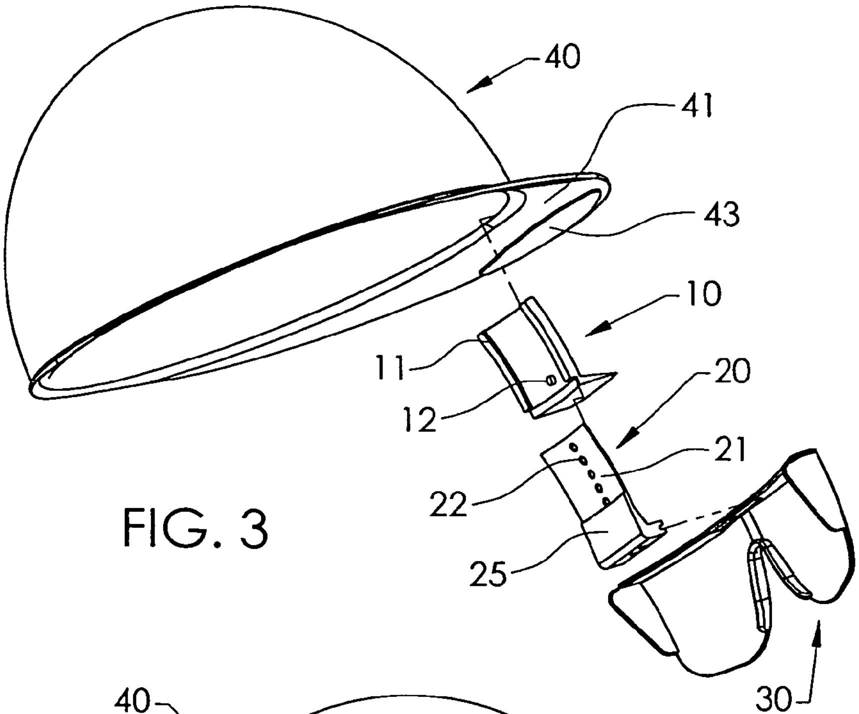
FIG. 3 is an exploded bottom perspective view of the embodiment of FIGS. 1 and 2.
Figure 4:
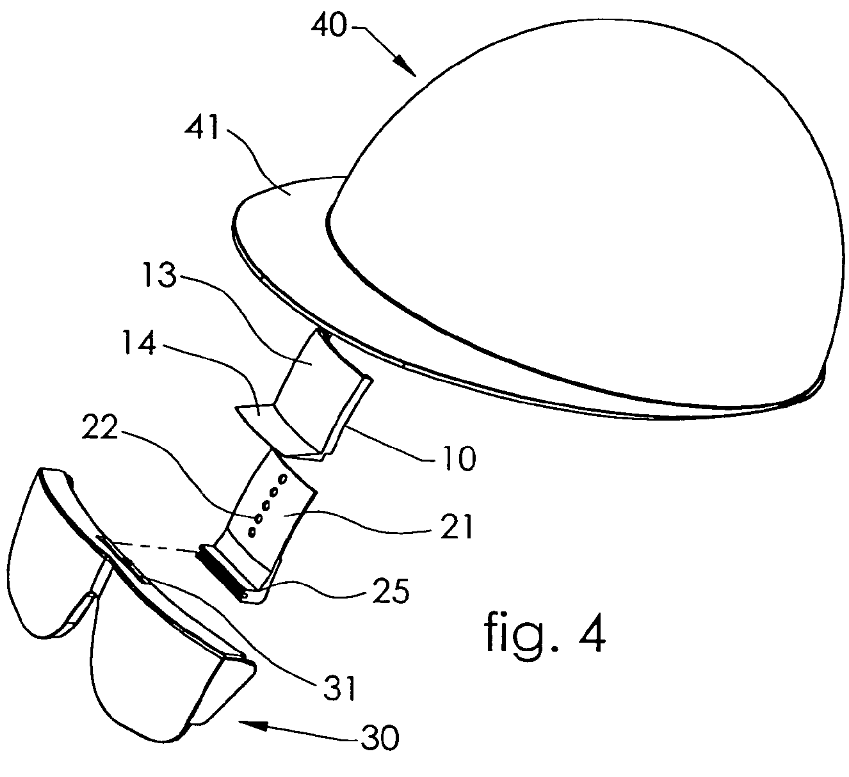
FIG. 4 is an exploded top perspective view of the embodiment of FIGS. 1, 2, and 3.

Referring to FIGS. 3 and 4, the preferred system has two basic parts: a base piece 10 and a connector piece 20. The system is adapted to accommodate various sizes and shapes of helmets. It also includes a corresponding pair of safety glasses adapted to cooperate with the system. The base piece 10 attaches to the helmet 40. The connector piece 20 is adjustably attached to the base piece 10. The safety glasses 30 are pivotally and removably attached to a clamping mechanism on the connector piece 20.

Figure 1:
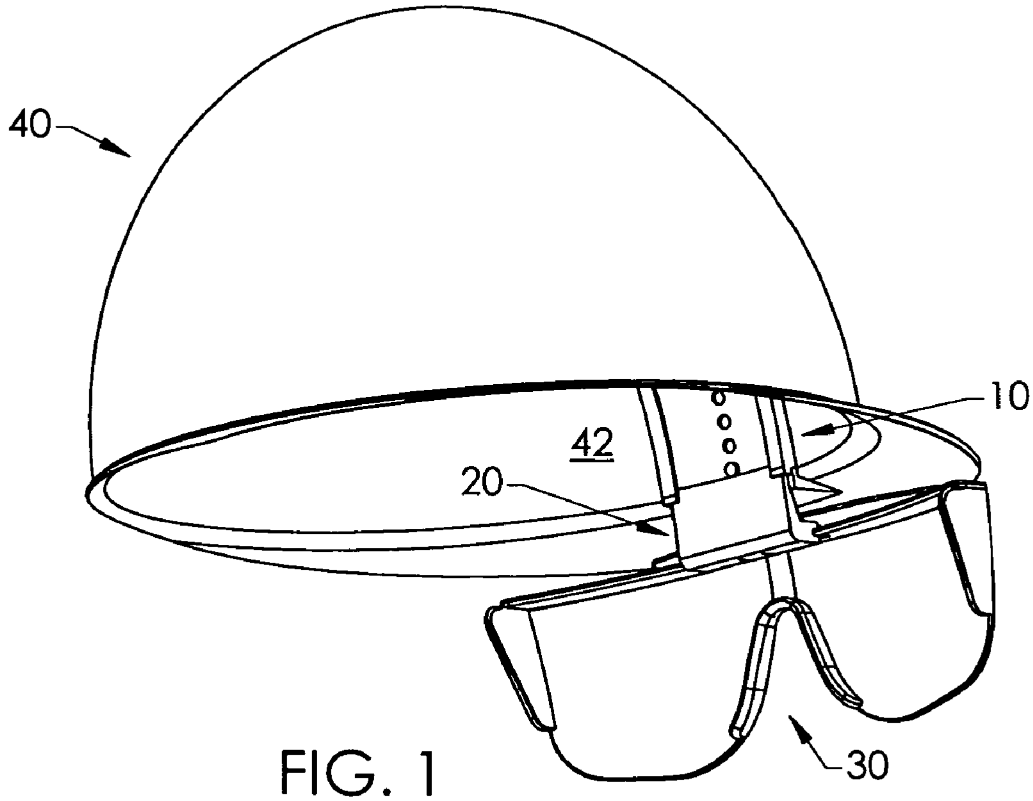
FIG. 1 is a rear perspective view of the preferred embodiment of the present invention with the safety glasses pivoted to the down position.

The base piece 10 connects to the helmet 40 on the inside of the bill 41 and the adjacent interior surface of the helmet dome 42 (see FIG. 1). While the figures illustrate a particular style of helmet with a particular style of bill/brim and a particular style of eyewear, many others may be used. The figures are not to be construed to require a particular shape or size or headgear, dome, bill/brim, or a particular shape or size of eyewear.

Preferably, the base piece is generally L-shaped, with a first leg and second leg being generally but not necessarily perpendicular (see base piece dome face 13 and bill face 14). The angle of the base piece may be adapted to match and fit securely against the junction of the helmet's bill and dome. Adhesive may be placed on the base piece's dome face 13 and/or bill face 14 to fix the base piece 10 to the helmet 40. Alternatively, the base 10 may be attached to a helmet by any known connection means such as, adhesives, snaps, or rivets, or may be constructed with the helmet as a unitary piece. Therefore, while an L-shaped base piece is preferred, there are other shapes and sizes besides an L-shape and there are other methods of securing the base piece to the helmet. While the preferred base piece attaches to both the dome and the bill, not all embodiments of the base piece must attach to both.

Figure 5:
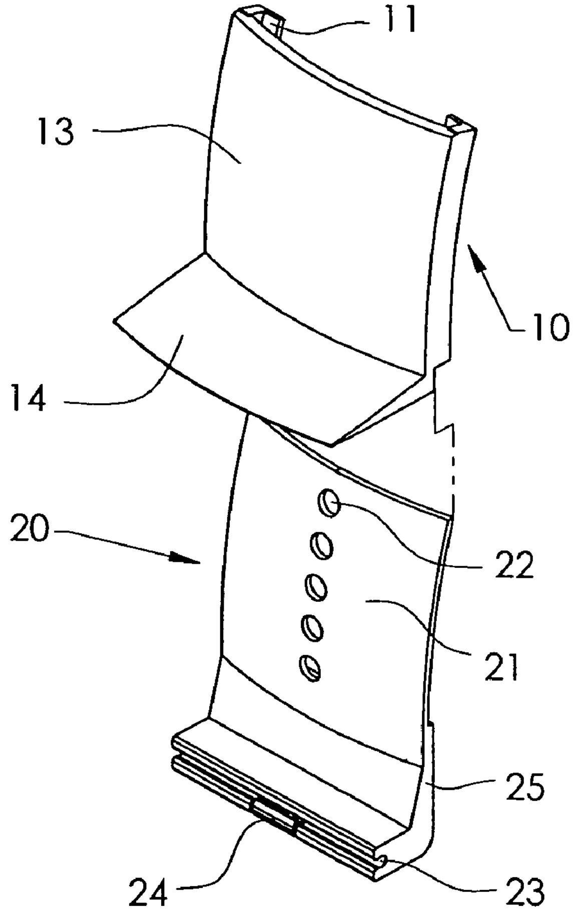
FIG. 5 is a front perspective, exploded, detail view of the preferred attachment mechanism of FIGS. 1–4.
Figure 6:
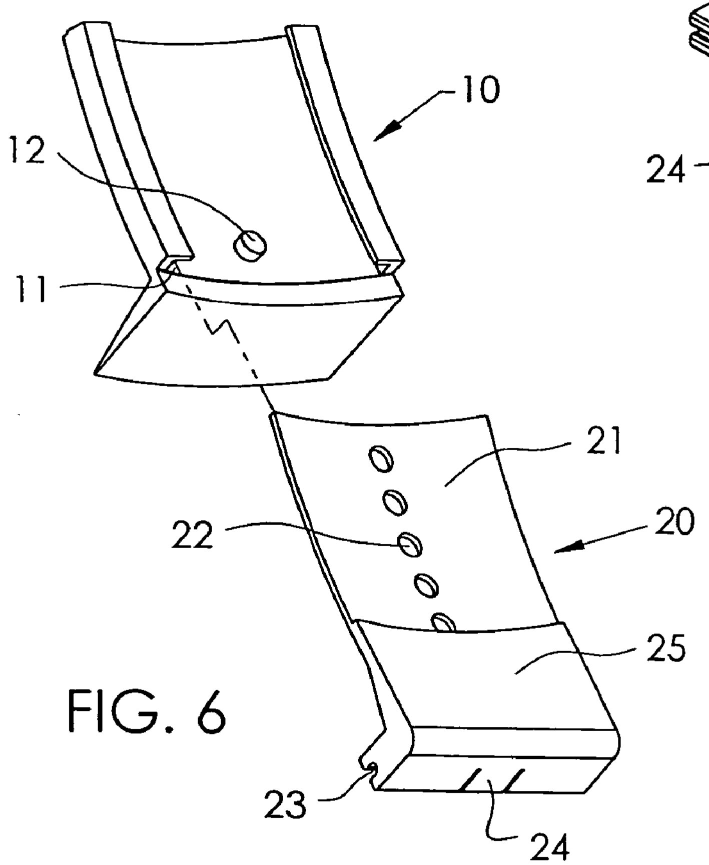
FIG. 6 is a back perspective, exploded, detail view of the preferred attachment mechanism of FIGS. 1–5.

Referring to FIGS. 5 and 6, the preferred base piece 10 also includes a channel 11 and a male snap knob 12. In addition, the shape or angle of the base 10 may be altered as necessary to fit to a variety of safety helmets. The connector piece 20 has a rail section 21 with one or more female snap holes 22. The rail section 21 cooperates with channel 11 and the male snap knob 12 cooperates with female snap holes 22 to attach the connector piece 20 to the base piece 10, as illustrated by FIG. 1. The multiplicity of female snap holes 22 allows the user to adjust the position of the connector piece 20 relative to the base piece 10 and helmet 40. Alternatively, there could be a multiplicity of male snap knobs 12 and one or more female snap holes 22. Also, the male snap knobs 12 could be placed on the rail piece 21 and the female snap holes 22 on the base piece 10. Other systems could be used to adjustably attach the connector piece 20 and base piece 21, such as a releasable clamp that could be used to create a frictional attachment.

Figure 2:
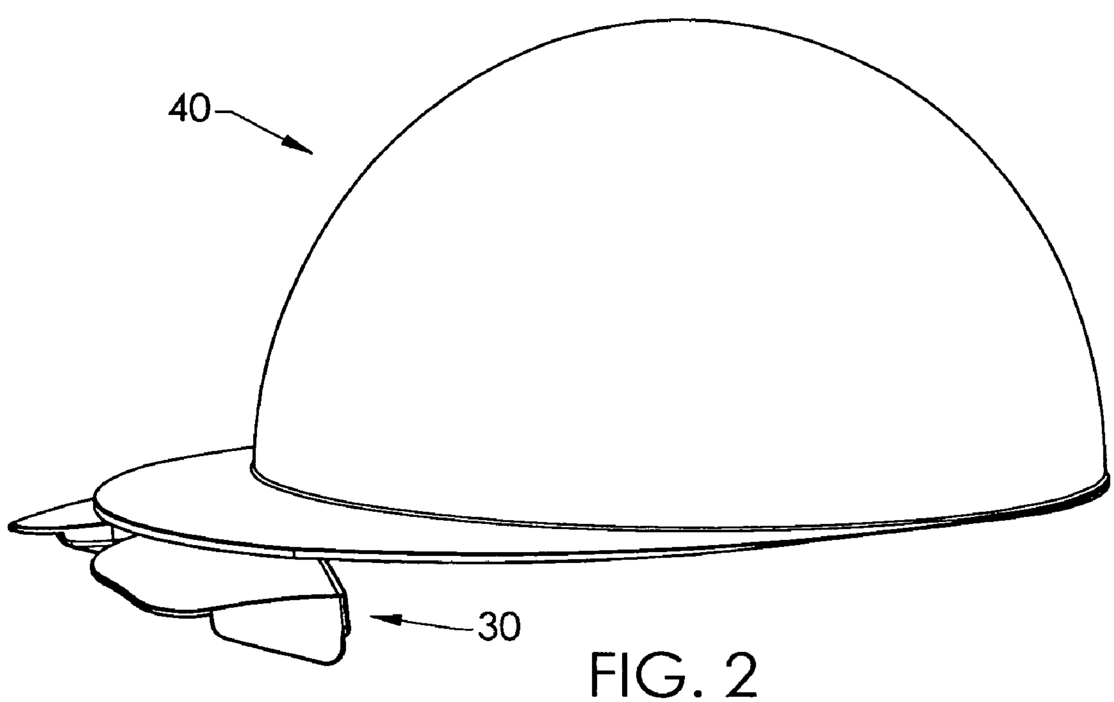
FIG. 2 is a side perspective view of the embodiment of FIG. 1 with the safety glasses pivoted to the up position.

Preferably, the glasses snap into a clamping mechanism. A clamp slot 23 receives and holds a cross-bar 31 on a pair of safety glasses 30. The preferred clamp slot 23 is narrower than the cross-bar 31 at its outer edge and sized to frictionally grip the cross-bar 31 tightly enough to keep the safety glasses from pivoting due to gravity, but loose enough to allow the user to easily pivot the safety glasses 30 without needing to remove the helmet 40. As illustrated by FIGS. 1 and 2, the glasses may be pivoted down in front of the user's eyes or up to the helmet bill as needed. Thus, the safety glasses 30 are adjustable via a plurality of systems: a slidable attachment that features generally a vertical component of movement, so that the glasses move up and down relative to the user's eyes and nose; and a pivotal attachment that features a horizontal component of movement as the glasses pivot forward from the nose and eyes and a vertical component of movement as the glasses pivot up to the bill.

Figure 7:
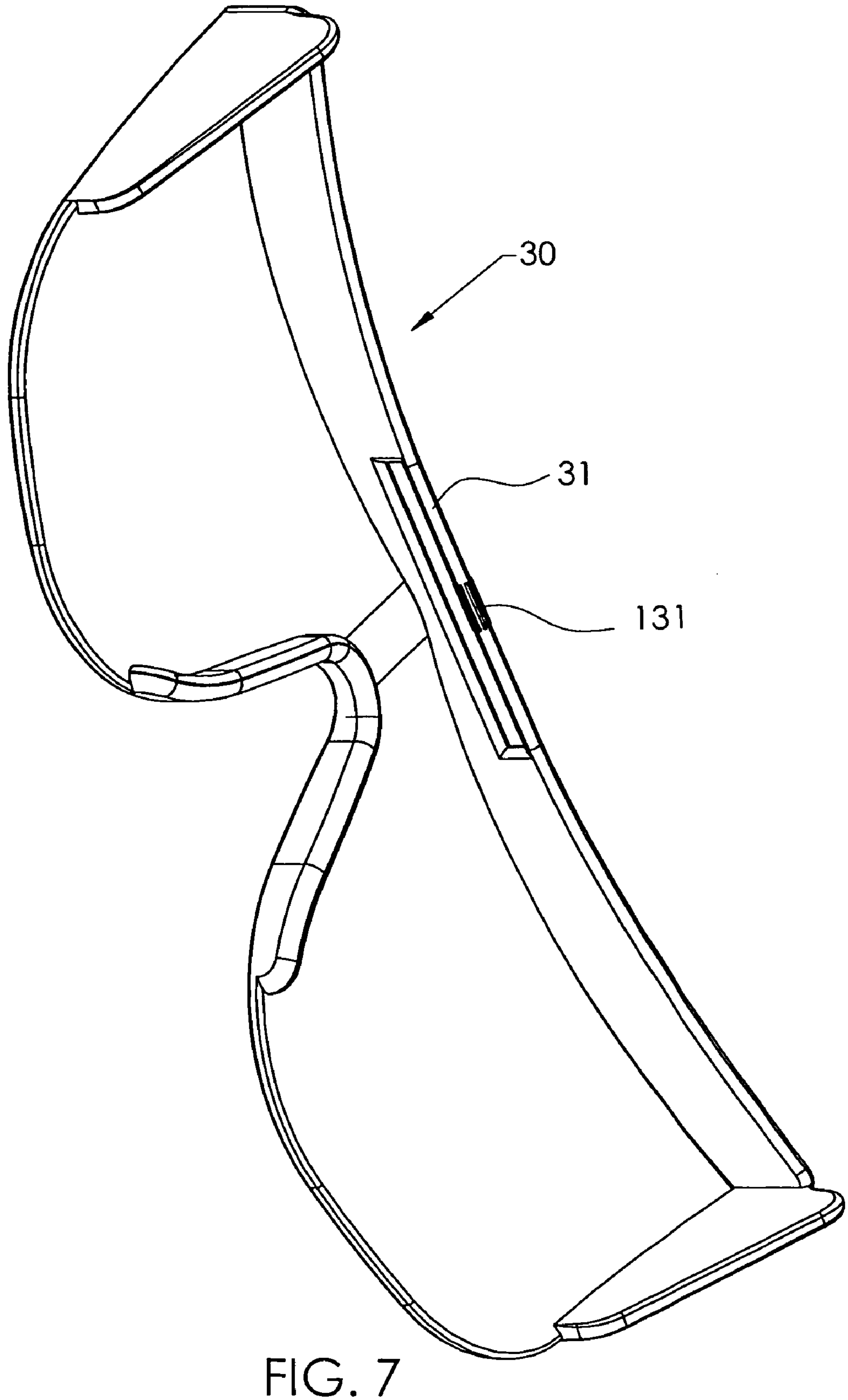
FIG. 7 is a perspective view of the preferred safety glasses of FIGS. 1–6.

The clamp slot 23 and cross-bar 31 may have smooth, circular cross-sections to allow the safety glasses 30 to pivot smoothly in the slot 23, so that the glasses easily can be stopped at any point in between the bill 41 and the user's face. Alternatively, the slot 23 and cross-bar 31 may have non-circular cross-sections, to provide some biasing or resistance to pivoting. For example, such an adaptation could bias the glasses to rest in either the generally vertical position in front of the eyes, or the lifted position near the bill. In a preferred embodiment, the cross-bar 31 is an axially-threaded or axially-grooved shaft, which tends to allow the glasses to be incrementally moved to multiple, discreet positions, and which, once the glasses in the selected position, also tends to retain the glasses in that selected position. In other words, the alternating axial grooves and axial ridges 131 (see FIG. 7) tend to bias the glasses to rest "in a groove" or "in between ridges," and, hence, to rest at a number of positions between fully-lowered and fully-raised. This may be convenient, especially for someone frequently raising and lowering the glasses. The entire cross-bar may be threaded or just a portion of the cross-bar (see FIGS. 4 and 7).

Preferably, there is a tab 24 defined by two slots cut into the bottom lip of the clamp slot 23 roughly in the center of the clamp slot 23. The tab 24 is forced downward when the cross-bar 31 is snapped into the clamp slot 23. Once the cross-bar 31 is fully in the clamp slot 23, the tab 24 returns to its original position or near to its original position due to the material's "memory" of its normal shape, thus, "clamping" the cross-bar 31 in place. Alternatively, the width of the opening into the clamp slot 23 may optionally be narrowed to achieve a snap-in attachment between the connection piece and the glasses 30, preferably without significantly increasing the frictional resistance to pivoting the glasses 30. Alternatively, the connector piece may include connection systems other than the clamp slot with or without tab 24. For example, various clamps, pivotal fasteners or sleeves, or other attachment mechanisms may be used; preferably, the attachment mechanism allows the eyeglasses to pivot up and down and to be removed, if desired, for cleaning or replacement.

In the preferred connector 20, there is a flexible section 25 between the rail piece 21 and the clamp slot 23. The preferred embodiment will resiliently bend and/or compress in this section 25 when force is applied to it. This design acts to absorb shocks to the helmet by flexing when a blow to the helmet forces the glasses into the user's face or when an object strikes the glasses directly. In the preferred embodiment, flexibility is achieved by manufacturing the connector piece 20 entirely or partially from a sufficiently flexible material. Optionally, additional shock absorption may be achieved by making the channel 11 and the rail piece 21 flexible and by connecting the base piece 10 to the helmet 40 only on the base piece's bill face 14, so that substantial portions of the base piece and of the connector piece bend/flex to absorb the shock of an impact to the helmet, further preventing transmission of that shock to the nose or eyes. The ability of the user to vertically and horizontally adjust the position of the safety glasses 30 relative to his face also reduces the likelihood, without sacrificing safety, of the safety glasses 30 being driven into the user's face.

While the preferred embodiment of glasses is shown in the Figures, any existing type of protective glasses may be easily adapted to work with this system. The glasses must be approved as safe for this use by the appropriate agencies. The glasses and attachment system could also be used with other types of helmets or hats, such as bicycle helmets, without violating the spirit of the invention. Further, the bottom surface of the bill 41 may be adapted to have a felt or other soft or cushioning portion to protect the glasses 30 when they are in the raised position, so that the lenses do not become scratched. Also, as shown in the Figures, the glasses may be fitted with a smooth nose portion for comfort. Further, the corners of the mounting device and the glasses may be rounded for safety purposes, in order to prevent the user from being injured with a sharp edge.

Although this invention has been described above with reference to particular means, materials, and embodiments, it is to be understood that the invention is not limited to these disclosed particulars, but extends instead to all equivalents within the scope of the following claims.

I claim:

1. A headgear and glasses combination, the combination comprising:

headgear comprising a dome, the dome having an interior surface defining a dome space for receiving a wearer's head, and said interior surface comprising a generally vertical front portion;

a pair of glasses; and a connection system connecting said pair of glasses to said headwear, the connection system having a proximal portion extending into said dome space near said front portion of said interior surface;

the connection system further having a distal portion receiving said pair of glasses and holding said pair of glasses generally vertically for placement in front of a user's eyes, the distal portion being slidably connected to said proximal portion so that the distal portion is slidable up inside said dome space and down out of said dome space generally parallel to said front portion of the interior surface to move the glasses up and down to better fit the individual user.

2. A connection system as in claim 1, wherein the distal portion pivotally receives said pair of glasses so that the glasses pivot around the distal portion from the generally vertical position in front of the eyes to a generally horizontal position above the user's eyes.

3. A connection system for connecting glasses to protective headwear, the connection system having a proximal portion adapted to be attached to protective headwear and a distal portion receiving a pair of glasses and holding said pair of glasses generally vertically for placement in front of a user's eyes, the distal portion being generally vertically slideable relative to the proximal portion so that the distal portion is vertically extendible from the proximal portion pair to move the glasses up and down to better fit the individual user;

wherein the proximal portion is generally L-shaped with generally perpendicular first and second legs, said first leg being adapted to attach to an interior surface of a dome of the protective headgear, and the second leg being adapted to attach to a bottom surface of a bill of the protective headgear;

wherein said proximal portion comprises a channel and said distal portion is elongated and slides up and down in said channel to move the glasses up and down vertically.

4. A connection system as in claim 3, comprising a lock system that fixes the distal portion to the proximal portion in any of multiple, incremental amounts of vertical extension from said proximal portion.

5. A connection system as in claim 4, wherein said lock system comprises a knob protruding from the proximal portion and removeably receivable in a plurality of holes arranged longitudinally in said distal portion.

6. A connection system as in claim 4, wherein said lock system comprises a knob protruding from the distal portion and removeably receivable in a plurality of holes arranged longitudinally in said proximal portion.

7. A connection system as in claim 3, comprising a lock system that fixes the distal portion to the proximal portion in any position along a continuous range of vertical extension from said proximal portion.

8. A connection system for connecting glasses to protective headwear, the connection system having a proximal portion adapted to be attached to protective headwear and a distal portion receiving a pair of glasses and holding said pair of glasses generally vertically for placement in front of a user's eyes, the distal portion being generally vertically slideable relative to the proximal portion so that the distal portion is vertically extendible from the proximal portion pair to move the glasses up and down to better fit the individual user;

wherein at least a part of the proximal portion or the distal portion is flexible so that said part absorbs shock to the headgear or the glasses.

9. A protective headgear and glasses combination, the combination comprising:

headgear comprising a dome surrounding and defining an interior space for receiving a user's head, the dome further having an interior surface near a front portion of the headgear, and the headgear further comprising a brim;

a pair of glasses;

a holder having a base portion attached to said front portion of the headgear, and having a connector portion receiving the pair of glasses and slideably extending generally vertically from the base portion to raise and lower the pair of glasses in a plane generally parallel to said interior surface, wherein the connector portion is slideable into the interior space of the headgear to raise the pair of glasses;

wherein the pair of glasses is pivotal in the connector portion so that the pair of glasses flips upward to extend generally parallel to and close to the brim and flips downward to be generally perpendicular to the brim and close to the user's eyes and nose.

10. A combination as in claim 9, wherein said pair of glasses are safety glasses.

11. A combination as in claim 9, wherein the base portion is generally L-shaped with generally perpendicular first and second legs, said first leg being attached to said interior surface of the dome, and the second leg being attached to a bottom surface of the brim.

12. A combination as in claim 9, wherein said base portion comprises a channel and said connector portion is elongated and slides up and down in said channel to move the glasses up and down generally vertically.

13. A combination as in claim 9, wherein the base portion is attached to said interior surface of the dome.

14. A combination as in claim 9, wherein the base portion comprises a leg that extends generally horizontally along, and is attached to, a bottom surface of the brim.

15. A combination as in claim 9, wherein said distal portion comprises a clamp mechanism that pivotally receives said pair of glasses, so that the glasses pivot around the clamp mechanism from the generally vertical position in front of the eyes to a generally horizontal position above the user's eyes, and wherein said clamp mechanism comprises a clamp slot with horizontal ridges that frictionally grip said pair of glasses.

16. A protective headgear and glasses combination, the combination comprising:

headgear comprising a dome and a brim;

a pair of glasses; and a holder having a base portion attached to the headgear at a position for placement generally in front of the user, and having a connector portion receiving the pair of glasses and slideably extending from the base portion to raise and lower the pair of glasses in a plane generally parallel to the plane of the glasses;

wherein the pair of glasses is pivotal in the connector portion so that the pair of glasses flips upward to extend generally parallel to and close to the brim and flips downward to be generally perpendicular to the brim and close to the user's eyes and nose; and the combination further comprising a lock system that fixes the connector portion to the base portion in any of multiple, incremental amounts of vertical extension from said base portion.

17. A combination as in claim 16, wherein said lock system comprises a knob protruding from the base portion and removeably receivable in a plurality of holes arranged longitudinally in said connector portion.

18. A combination as in claim 16, wherein said lock system comprises a knob protruding from the connector portion and removeably receivable in a plurality of holes arranged longitudinally in said base portion.

19. A protective headgear and glasses combination, the combination comprising:

headgear comprising a dome and a brim;

a pair of glasses;

a holder having a base portion attached to the headgear at a position for placement generally in front of the user, and having a connector portion receiving the pair of glasses and slideably extending from the base portion to raise and lower the pair of glasses in a plane generally parallel the plane of the glasses;

wherein the pair of glasses is pivotal in the connector portion so that the pair of glasses flips upward to extend generally parallel to and close to the brim and flips downward to be generally perpendicular to the brim and close to the user's eyes and nose; and the combination further comprising a lock system that fixes the distal portion to the proximal portion in any position along a continuous range of vertical extension from said proximal portion.

20. A protective headgear and glasses combination, the combination comprising:

headgear comprising a dome and a brim;

a pair of glasses;

a holder having a base portion attached to the headgear at a position for placement generally in front of the user, and having a connector portion receiving the pair of glasses and slideably extending from the base portion to raise and lower the pair of glasses in a plane generally parallel the plane of the glasses;

wherein the pair of glasses is pivotal in the connector portion so that the pair of glasses flips upward to extend generally parallel to and close to the brim and flips downward to be generally perpendicular to the brim and close to the user's eyes and nose; and wherein at least part of the holder is flexible and resilient, so that said part absorbs shock to the headgear or the glasses.

* * * * *